United States Patent
Palou (10) Patent No.: US 11,314,738 B2
(45) Date of Patent: *Apr. 26, 2022

(54) SEARCHING CHARTS

(71) Applicant: Palantir Technologies Inc., Palo Alto, CA (US)

(72) Inventor: Guillem Palou, London (GB)

(73) Assignee: Palantir Technologies Inc., Denver, CO (US)

( * ) Notice: Subject to any disclaimer, the term of this patent is extended or adjusted under 35 U.S.C. 154(b) by 139 days.

This patent is subject to a terminal disclaimer.

(21) Appl. No.: 16/567,477

(22) Filed: Sep. 11, 2019

(65) Prior Publication Data

US 2020/0004741 A1 Jan. 2, 2020

Related U.S. Application Data

(63) Continuation of application No. 14/581,227, filed on Dec. 23, 2014, now Pat. No. 10,452,651.

(51) Int. Cl.
*G06F 16/245* (2019.01)

(52) U.S. Cl.
CPC .................. *G06F 16/245* (2019.01)

(58) Field of Classification Search
CPC .................................................... G06F 16/245
See application file for complete search history.

(56) References Cited

U.S. PATENT DOCUMENTS

| | | |
|---|---|---|
| 5,532,717 A | 7/1996 | Jones et al. |
| 5,724,575 A | 3/1998 | Hoover et al. |
| 5,872,973 A | 2/1999 | Mitchell et al. |
| 5,897,636 A | 4/1999 | Kaeser |
| 6,073,129 A | 6/2000 | Levine et al. |
| 6,094,653 A | 7/2000 | Li et al. |
| 6,161,098 A | 12/2000 | Wallman |
| 6,243,717 B1 | 6/2001 | Gordon et al. |
| 6,304,873 B1 | 10/2001 | Klein et al. |
| 6,366,933 B1 | 4/2002 | Ball et al. |
| 6,418,438 B1 | 7/2002 | Campbell |
| 6,510,504 B2 | 1/2003 | Satyanarayana |

(Continued)

FOREIGN PATENT DOCUMENTS

| | | |
|---|---|---|
| AU | 2014206155 | 12/2015 |
| EP | 0652513 | 5/1995 |

(Continued)

OTHER PUBLICATIONS

"The Apache Cassandra Project," http://cassandra.apache.org/ Printed Sep. 14, 2011 in 3 pages.

(Continued)

*Primary Examiner* — Etienne P Leroux
*Assistant Examiner* — Husam Turki Samara
(74) *Attorney, Agent, or Firm* — Knobbe Martens Olson & Bear LLP (57) ABSTRACT

Approaches for indexing and comparing charts are described. A system can receive one or more charts, which may include depictions of signals, and index portions of a chart using a sliding window algorithm. Subsequently, a system can receive a query that can be compared to the indexed portions of one or more charts. After a comparison, the most similar portions of the compared charts are provided based on a nearest neighbour search.

20 Claims, 6 Drawing Sheets

(56) References Cited

U.S. PATENT DOCUMENTS

| | | |
|---|---|---|
| 6,549,752 B2 | 4/2003 | Tsukamoto |
| 6,560,620 B1 | 5/2003 | Ching |
| 6,574,635 B2 | 6/2003 | Stauber et al. |
| 6,609,085 B1 | 8/2003 | Uemura et al. |
| 6,745,382 B1 | 6/2004 | Zothner |
| 6,976,210 B1 | 12/2005 | Silva et al. |
| 6,980,984 B1 | 12/2005 | Huffman et al. |
| 7,058,648 B1 | 6/2006 | Lightfoot et al. |
| 7,111,231 B1 | 9/2006 | Huck et al. |
| 7,194,680 B1 | 3/2007 | Roy et al. |
| 7,233,843 B2 | 6/2007 | Budhraja et al. |
| 7,461,158 B2 | 12/2008 | Rider et al. |
| 7,667,582 B1 | 2/2010 | Waldorf |
| 7,725,530 B2 | 5/2010 | Sah et al. |
| 7,725,728 B2 | 5/2010 | Ama et al. |
| 7,730,082 B2 | 6/2010 | Sah et al. |
| 7,730,109 B2 | 6/2010 | Rohrs et al. |
| 7,761,407 B1 | 7/2010 | Stern |
| 7,814,084 B2 | 10/2010 | Hallett et al. |
| 7,844,892 B2 | 11/2010 | Shewchenko et al. |
| 7,962,495 B2 | 6/2011 | Jain et al. |
| 7,984,374 B2 | 7/2011 | Caro et al. |
| 8,041,714 B2 | 10/2011 | Aymeloglu et al. |
| 8,060,259 B2 | 11/2011 | Budhraja et al. |
| 8,112,425 B2 | 2/2012 | Baum et al. |
| 8,126,848 B2 | 2/2012 | Wagner |
| 8,185,819 B2 | 5/2012 | Sah et al. |
| 8,401,710 B2 | 3/2013 | Budhraja et al. |
| 8,504,542 B2 | 8/2013 | Chang et al. |
| 8,676,857 B1 | 3/2014 | Adams et al. |
| 8,930,331 B2 | 1/2015 | McGrew et al. |
| 8,954,410 B2 | 2/2015 | Chang et al. |
| 9,009,827 B1 | 4/2015 | Albertson et al. |
| 9,043,696 B1 | 5/2015 | Meiklejohn et al. |
| 9,092,482 B2 | 7/2015 | Harris et al. |
| 9,116,975 B2 | 8/2015 | Shankar et al. |
| 9,195,700 B1 | 11/2015 | Becker |
| 9,208,159 B2 | 12/2015 | Stowe et al. |
| 9,230,280 B1 | 1/2016 | Maag et al. |
| 9,280,532 B2 | 3/2016 | Cicerone |
| 9,672,257 B2 | 6/2017 | Tobin et al. |
| 9,753,935 B1 | 9/2017 | Tobin et al. |
| 10,452,651 B1 | 10/2019 | Palou |
| 2001/0051949 A1 | 12/2001 | Carey et al. |
| 2001/0056522 A1 | 12/2001 | Satyanarayana |
| 2002/0091694 A1 | 7/2002 | Hrle et al. |
| 2003/0105759 A1 | 6/2003 | Bess et al. |
| 2003/0115481 A1 | 6/2003 | Baird et al. |
| 2003/0120675 A1 | 6/2003 | Stauber et al. |
| 2003/0130993 A1 | 7/2003 | Mendelevitch et al. |
| 2003/0212718 A1 | 11/2003 | Tester |
| 2004/0111410 A1 | 6/2004 | Burgoon et al. |
| 2004/0117345 A1 | 6/2004 | Bamford et al. |
| 2004/0117387 A1 | 6/2004 | Civetta et al. |
| 2004/0148301 A1 | 7/2004 | McKay et al. |
| 2005/0097441 A1 | 5/2005 | Herbach et al. |
| 2005/0108231 A1 | 5/2005 | Findleton et al. |
| 2005/0114763 A1 | 5/2005 | Nonomura et al. |
| 2005/0131990 A1 | 6/2005 | Jewell |
| 2005/0289524 A1 | 12/2005 | McGinnes |
| 2006/0074881 A1 | 4/2006 | Vembu et al. |
| 2006/0080316 A1 | 4/2006 | Gilmore et al. |
| 2006/0095521 A1 | 5/2006 | Patinkin |
| 2006/0106847 A1 | 5/2006 | Eckardt et al. |
| 2006/0116991 A1 | 6/2006 | Calderwood |
| 2006/0161558 A1 | 7/2006 | Tamma et al. |
| 2006/0218206 A1 | 9/2006 | Bourbonnais et al. |
| 2006/0218405 A1 | 9/2006 | Ama et al. |
| 2006/0218491 A1 | 9/2006 | Grossman et al. |
| 2006/0242630 A1 | 10/2006 | Koike et al. |
| 2006/0253502 A1 | 11/2006 | Raman et al. |
| 2006/0265397 A1 | 11/2006 | Bryan et al. |
| 2006/0288035 A1 | 12/2006 | Viavant |
| 2007/0050429 A1 | 3/2007 | Goldring et al. |
| 2007/0061487 A1 | 3/2007 | Moore et al. |
| 2007/0143108 A1 | 6/2007 | Kurozumi et al. |
| 2007/0143253 A1 | 6/2007 | Kostamaa et al. |
| 2007/0185850 A1 | 8/2007 | Walters et al. |
| 2007/0233756 A1 | 10/2007 | D'Souza et al. |
| 2007/0271317 A1 | 11/2007 | Carmel |
| 2008/0015970 A1 | 1/2008 | Brookfield et al. |
| 2008/0104060 A1 | 5/2008 | Abhyankar et al. |
| 2008/0104149 A1 | 5/2008 | Vishniac et al. |
| 2008/0195672 A1 | 8/2008 | Hamel et al. |
| 2008/0201339 A1 | 8/2008 | McGrew |
| 2008/0215546 A1 | 9/2008 | Baum et al. |
| 2008/0270316 A1 | 10/2008 | Guidotti et al. |
| 2008/0301378 A1 | 12/2008 | Carrie |
| 2009/0031247 A1 | 1/2009 | Walter et al. |
| 2009/0106308 A1 | 4/2009 | Killian et al. |
| 2009/0164387 A1 | 6/2009 | Armstrong et al. |
| 2009/0177962 A1 | 7/2009 | Gusmorino et al. |
| 2009/0254971 A1 | 10/2009 | Herz |
| 2009/0271435 A1 | 10/2009 | Yako et al. |
| 2009/0313223 A1 | 12/2009 | Rantanen |
| 2009/0313311 A1 | 12/2009 | Hoffmann et al. |
| 2010/0036831 A1 | 2/2010 | Vemuri et al. |
| 2010/0070489 A1 | 3/2010 | Aymeloglu et al. |
| 2010/0076939 A1 | 3/2010 | Iwaki et al. |
| 2010/0082541 A1 | 4/2010 | Kottomtharayil |
| 2010/0114817 A1 | 5/2010 | Broeder et al. |
| 2010/0114831 A1 | 5/2010 | Gilbert et al. |
| 2010/0114887 A1 | 5/2010 | Conway et al. |
| 2010/0138842 A1 | 6/2010 | Balko et al. |
| 2010/0145909 A1 | 6/2010 | Ngo |
| 2010/0161565 A1 | 6/2010 | Lee et al. |
| 2010/0161688 A1 | 6/2010 | Kesselman et al. |
| 2010/0191884 A1 | 7/2010 | Holenstein et al. |
| 2010/0211550 A1 | 8/2010 | Daniello et al. |
| 2010/0211618 A1 | 8/2010 | Anderson et al. |
| 2010/0231595 A1* | 9/2010 | Dang .................. G06F 16/283 |
| | | 345/440 |
| 2010/0235606 A1 | 9/2010 | Oreland et al. |
| 2010/0283787 A1 | 11/2010 | Hamedi et al. |
| 2010/0325581 A1 | 12/2010 | Finkelstein et al. |
| 2011/0029498 A1 | 2/2011 | Ferguson et al. |
| 2011/0047540 A1 | 2/2011 | Williams et al. |
| 2011/0153592 A1 | 6/2011 | DeMarcken |
| 2011/0173619 A1 | 7/2011 | Fish |
| 2011/0184813 A1 | 7/2011 | Barne et al. |
| 2011/0218978 A1 | 9/2011 | Hong et al. |
| 2011/0258158 A1 | 10/2011 | Resende et al. |
| 2011/0258242 A1 | 10/2011 | Eidson et al. |
| 2011/0270812 A1 | 11/2011 | Ruby |
| 2012/0072825 A1 | 3/2012 | Sherkin et al. |
| 2012/0123989 A1 | 5/2012 | Yu et al. |
| 2012/0124179 A1 | 5/2012 | Cappio et al. |
| 2012/0150791 A1 | 6/2012 | Willson |
| 2012/0150925 A1 | 6/2012 | Gupta et al. |
| 2012/0159307 A1 | 6/2012 | Chung et al. |
| 2012/0221589 A1 | 8/2012 | Shahar et al. |
| 2012/0272186 A1* | 10/2012 | Kraut .................... G06F 3/0482 |
| | | 715/810 |
| 2012/0330908 A1 | 12/2012 | Stowe et al. |
| 2012/0330931 A1 | 12/2012 | Nakano et al. |
| 2013/0036346 A1 | 2/2013 | Cicerone |
| 2013/0060742 A1 | 3/2013 | Chang et al. |
| 2013/0066882 A1 | 3/2013 | Westbrooke |
| 2013/0097130 A1 | 4/2013 | Bingol et al. |
| 2013/0103657 A1 | 4/2013 | Ikawa et al. |
| 2013/0151388 A1 | 6/2013 | Falkenborg et al. |
| 2013/0304770 A1 | 11/2013 | Boero et al. |
| 2013/0318060 A1 | 11/2013 | Chang et al. |
| 2014/0040276 A1 | 2/2014 | Chen et al. |
| 2014/0095543 A1 | 4/2014 | Hsiao et al. |
| 2014/0101139 A1 | 4/2014 | Gemert et al. |
| 2014/0149272 A1 | 5/2014 | Hirani et al. |
| 2014/0181833 A1 | 6/2014 | Bird et al. |
| 2014/0247946 A1 | 9/2014 | Sen et al. |
| 2014/0324876 A1 | 10/2014 | Konik et al. |
| 2014/0344231 A1 | 11/2014 | Stowe et al. |
| 2015/0039886 A1 | 2/2015 | Kahol et al. |
| 2015/0089353 A1 | 3/2015 | Folkening |
| 2015/0106347 A1 | 4/2015 | McGrew et al. |

(56) References Cited

U.S. PATENT DOCUMENTS

| | | |
|---|---|---|
| 2015/0112956 A1 | 4/2015 | Chang et al. |
| 2015/0186338 A1 | 7/2015 | Mirra et al. |
| 2015/0186434 A1 | 7/2015 | Eichinger et al. |
| 2015/0212663 A1 | 7/2015 | Papale et al. |
| 2015/0213043 A1 | 7/2015 | Ishii et al. |
| 2015/0213134 A1 | 7/2015 | Nie et al. |
| 2015/0227295 A1 | 8/2015 | Meiklejohn et al. |
| 2015/0242397 A1 | 8/2015 | Zhuang |
| 2015/0261817 A1 | 9/2015 | Harris et al. |
| 2015/0278325 A1 | 10/2015 | Masuda et al. |
| 2015/0341467 A1 | 11/2015 | Lim et al. |
| 2015/0379065 A1 | 12/2015 | Yoshizawa et al. |
| 2016/0034545 A1 | 2/2016 | Shankar et al. |
| 2016/0062555 A1 | 3/2016 | Ward et al. |
| 2016/0088013 A1 | 3/2016 | Watson et al. |
| 2016/0164912 A1 | 6/2016 | Del Fante |
| 2016/0253679 A1 | 9/2016 | Venkatraman et al. |
| 2016/0275432 A1 | 9/2016 | Guinness et al. |
| 2016/0328432 A1 | 11/2016 | Raghunathan |
| 2017/0270172 A1 | 9/2017 | Tobin et al. |
| 2017/0355036 A1 | 12/2017 | Rozmarynowski et al. |
| 2018/0039651 A1 | 2/2018 | Tobin et al. |
| 2018/0181629 A1 | 6/2018 | Stowe et al. |
| 2019/0171775 A1 | 6/2019 | Martin et al. |

FOREIGN PATENT DOCUMENTS

| | | |
|---|---|---|
| EP | 1126384 | 8/2001 |
| EP | 2555126 | 2/2013 |
| EP | 2863326 | 4/2015 |
| EP | 2891992 | 7/2015 |
| EP | 2993595 | 3/2016 |
| EP | 3101560 | 12/2016 |
| EP | 3279813 | 2/2018 |
| EP | 3343403 | 7/2018 |
| EP | 3493109 | 6/2019 |
| WO | WO 2008/043082 | 4/2008 |
| WO | WO 2012/025915 | 3/2012 |
| WO | WO 2014/019349 | 2/2014 |

OTHER PUBLICATIONS

"Apache HBase," http://hbase.apache.org/ printed Sep. 14, 2011 in 1 page.

Anonymous, "BackTult—JD Edwards One World Version Control System", in 1 page, Jul. 23, 2007.

Antoshenkov, Gennady, "Dictionary-Based Order-Preserving String Compression", The VLDB Journal, pp. 26-39, 1997.

Baker et al., "Megastore: Providing Scalable, Highly Available Storage for Interactive Services", 5th Biennial Conference on Innovative Data Systems Research (CIDR '11), Asilomar, California, pp. 223-234, Jan. 9-12, 2011.

Bernstein et al., "Hyder—A Transactional Record Manager for Shared Flash", 5th Biennial Conference on Innovative Data Systems Research (CIDR'11), vol. 12, Asilomar, California, pp. 9-20, Jan. 9-12, 2011.

Chang et al., "Bigtable: A Distributed Storage System for Structured Data", Google, Inc., OSDI'06: Seventh Symposium on Operating System Design and Implementation, Seattle, WA, pp. 1-14, Nov. 2006.

Chung, Chin-Wan, "Dataplex: An Access to Heterogeneous Distributed Databases", Communications of the ACM, Association for Computing Machinery, Inc., vol. 33, Issue No. 1, pp. 70-80, Jan. 1, 1990.

Devanbu et al., "Authentic Third-party Data Publication", http://www.cs.ucdavis.edu/~devanbu//authdbpub.pdf, pp. 1-19, 2000.

Dreyer et al., "An Object-Oriented Data Model for a Time Series Management System", Proceedings of the 7th International Working Conference on Scientific and Statistical Database Management, 12 pages, Charlottesville, Virginia, USA, Sep. 28-30, 1994.

Elmasri et al., "Fundamentals of Database Systems", Fourth Edition, pp. 455-491, 2004.

Hogue et al., "Thresher: Automating the Unwrapping of Semantic Content from the World Wide Web", 14th International Conference on World Wide Web, WWW 2005: Chiba, Japan, pp. 86-95, May 10-14, 2005.

Klemmer et al., "Where Do Web Sites Come From? Capturing and Interacting with Design History," Association for Computing Machinery, CHI 2002, Apr. 20-25, 2002, Minneapolis, MN, 8 pages.

Kokossi et al., "D7-Dynamic Ontology Management System (Design)", Information Societies Technology Programme, pp. 1-27, Oct. 2002.

Mentzas et al., "An Architecture for Intelligent Assistance in the Forecasting Process", Proceedings of the Twenty-Eighth Hawaii International Conference on System Sciences, vol. 3, pp. 167-176, Jan. 3-6, 1995.

Miklau et al., "Securing History: Privacy and Accountability in Database Systems", 3rd Biennial Conference on Innovative Data Systems Research (CIDR), pp. 387-396, Asilomar, California, Jan. 7-10, 2007.

Niepert et al., "A Dynamic Ontology for a Dynamic Reference Work", Joint Conference on Digital Libraries, 10 pages, Vancouver, British Columbia, Jun. 17-22, 2007.

Nierman, "Evaluating Structural Similarity in XML Documents", 6 pages, 2002.

Peng et al., "Large-scale Incremental Processing Using Distributed Transactions and Notifications", Proceedings of the 9th USENIX Symposium on Operating Systems Design and Implementation, USENIX, pp. 1-14, 2010.

Quest, "Toad for ORACLE 11.6—Guide to Using Toad", 162 pages, Sep. 24, 2012.

Thomson et al., "The Case for Determinism in Database Systems", The 36th International Conference on Very Large Data Bases, Proceedings of the VLDB Endowment, vol. 3, Issue No. 1, 11 pages, Singapore, Sep. 13-17, 2010.

Wikipedia, "Federated Database System," Sep. 7, 2013, retrieved from the internet on Jan. 27, 2015, http://en.wikipedia.org/w/index.php?title=Federated_database_system&oldid=571954221, 6 pages.

Wollrath et al., "A Distributed Object Model for the Java System", Conference on Object-Oriented Technologies and Systems, pp. 219-231, Jun. 17-21, 1996.

Yang et al., "HTML Page Analysis Based on Visual Cues", A129, pp. 859-864, 2001.

Zhao et al., "Exploratory Analysis of Time-Series with ChronoLenses," IEEE Transactions on Visualization and Computer Graphics, vol. 17, No. 12, Oct. 23, 2011, pp. 2422-2431.

Official Communication for European Patent Application No. 18207202.5 dated Apr. 18, 2019, 9 pages.

* cited by examiner

SEARCHING CHARTS

CROSS-REFERENCE TO RELATED APPLICATIONS

This application is a continuation of U.S. patent application Ser. No. 14/581,227, filed Dec. 23, 2014, and titled "SEARCHING CHARTS." The entire disclosure of the above item is hereby made part of this specification as if set forth fully herein and incorporated by reference for all purposes, for all that it contains.

Any and all applications for which a foreign or domestic priority claim is identified in the Application Data Sheet as filed with the present application are hereby incorporated by reference under 37 CFR 1.57.

BACKGROUND

As larger amounts of memory are able to be stored in smaller spaces, users can store more data than ever before. Data can be graphically represented in a variety of ways, including by a chart. Many types of charts can be used to represent data, including bar charts, pie charts, and line charts. Line charts are similar to scatter plots, except that measurement points are ordered (typically by their X-axis value) and joined with straight line segments. Often times, line charts show how data changes over equal intervals of time. As such, the X-axis in a line chart can represent an hour, a day, a year, etc. Line charts are often used to visualize a trend in data over intervals of time, and thus the line is often drawn chronologically.

Comparing two line charts by their appearance can be difficult for many reasons. For instance, various line charts may display time in different intervals/resolutions. While the data displayed on two line charts may look the same, one chart may include data for a given day while another may include data for a given week. Similarly, the Y-axes on various charts have different minimum and/or maximum values. For instance, the Y-axes on two charts may both display temperature, but one chart may display up to 200 degrees, while the other chart only displays up to 100 degrees. Thus, although the scale of two line charts may be different, the data represented by the graphs may appear very similar when normalized.

BRIEF DESCRIPTION OF THE DRAWINGS

Reference will now be made to the accompanying drawings, which illustrate exemplary embodiments of the present disclosure and in which.

DETAILED DESCRIPTION OF EXEMPLARY EMBODIMENTS

Reference will now be made in detail to exemplary embodiments, the examples of which are illustrated in the accompanying drawings. Whenever possible, the same reference numbers will be used throughout the drawings to refer to the same or like parts.

Embodiments describing methods, systems, and non-transitory computer-readable mediums for indexing and searching for charts are described herein. It should be understood that charts, as used herein, include data that is displayed in a visual format. That data can include features, which in turn can be stored as a vector. Typically, a chart includes an X-axis and a Y-axis, and represents a first set of data with reference to a second set of data (e.g., temperature/time, etc.).

In some embodiments, a chart may be a portion of a larger chart (which can be referred to herein as a sub-chart, a sub-window, sub-set data (which can comprise sub-set features), etc.). For example, a chart that includes time data can include a week of data, but a sub-chart of the chart might display only a day of data. If a user were to view a sub-chart of the sub-chart, the user may see a chart that displays only an hour of data, or even a second or less of data (e.g., sub-set data). Of course, it should be appreciated that data, which can be displayed as a chart, can represent values other than time.

Often, a signal can be displayed in a chart. In some examples, signals can be displayed as values and their relationship to time. Thus, signals are easily displayed on charts. For example, an electrical signal or a radio wave may be displayed on a chart. As another example, large amounts of data received from sensors or other electronic devices can be displayed as a chart. Sensors can deliver one or more data sets over a period of time. For example, a sensor can monitor pressure, temperature, vibration, oxygen levels, radiation, etc.

In some cases, a user may want to search a chart to see if there are any one or more portions of the chart that resemble another chart. For instance, a user might find an interesting pattern displayed in a chart, and want to search other portions of that chart, or another chart, for a similar pattern. It should be appreciated that, in various embodiments, although charts are used as examples, the present disclosure can determine similar patterns independent of the form of visualization (e.g., a chart).

As an example, a user may want to determine what causes a device to overheat. In such a case the user can view a portion of a chart indicating that the device is about to overheat and compare that portion of the chart to other charts, or previous portions of the same chart to see if a similar pattern occurred prior to another overheating event. Based the appearance of patterns in charts that indicate that a device is about to overheat, a user or an electronic device can predict future overheating. Further, based on this information, a user or electronic device can deactivate a device when it determines a particular pattern in a chart in order to prevent a device from overheating.

Described herein are approaches for comparing and/or associating charts which include both indexing at least portions of one or more charts, as well as searching a database or other data storage device comprising at least portions of one or more charts.

With regard to indexing features of a chart, approaches described herein contemplate determining sub-charts of one or more charts (which can include one or more graphical representations of a signal) using a "sliding window" algorithm, and computing a set of features for each sub-chart (also referred to as sub-set features or sub-chart features) created by the sliding window. Once captured, the sub-charts and/or sub-set features/sub-chart features can be stored. For example, the sub-set features may be stored as a vector in a database, or some other storage device (as with all charts, sub-charts, sub-sets of data, etc.). The number of sub-charts (also known as sub-windows when referenced in association with a sliding window algorithm) to be stored and indexed can configured by a user, or can be based on resources such as an amount of bandwidth available or an amount of processing available.

In various embodiments described herein, a sliding window algorithm includes determining and storing portions of a chart (interchangeably referred to as a sub-charts, windows of a chart, sub-windows, etc.). Sub-charts determined/created based on a sliding window algorithm overlap as the "window" slides across the larger chart. For example, a sliding window may begin by capturing a sub-chart that has a height (also referred to as a range or scale) that is the size of the chart (e.g., the Y-axis), but only a portion of the width of the chart (e.g., the X-axis, time). Thus, for example, when applying a sliding window to a chart that includes 1 minute of data, the sliding window can create and store sub-charts for all values of the 1 minute chart between 0 seconds and 10 seconds, 1 and 11 seconds, 2 and 12 seconds, etc. such that fifty 10-second-interval sub-charts are created that correspond with the 1 minute chart. Similarly, fifty-five 5-second-interval sub-charts can be created that correspond with the minute long chart. Charts of any size can be created, stored and indexed using a sliding window algorithm. Although not always necessary, each sub-chart can overlap with another sub-chart, such that some or all of the larger chart is stored as a set of sub-charts. In some embodiments, the size and amount of charts/sub-charts that are stored can be configured by an administrator, or based on an amount of resources such as storage space or processing power. For instance, an administrator or a device can specify that a set of sub-charts to be stored should include either 5 seconds of data or 10 seconds of data based on an amount of storage space, network resources, the type of data (e.g., temperature data, vibration data, etc.), or any other factor. In some embodiments, sub-charts of different sizes (e.g., lengths of time) can be created and/or indexed using a sliding window algorithm. For instance, a set of sub-charts can include a combination of sub-charts including 5 seconds of data and sub-charts including 10 seconds of data. It is appreciated that a set of sub-charts created by a sliding window algorithm could include sub-charts of many different resolutions (e.g., 5 seconds, 10 seconds, 20 seconds, etc.)

The sliding window technique is often used because if a section of a chart is not stored, or is stored without the sections of the chart immediately preceding and/or succeeding the section, a chart search at a later time may miss the section of the chart because the query (e.g., chart(s) to search for) was spread across multiple sub-charts—which might not have happened had the sliding window technique been employed for capturing overlapping sections of the chart. For example, if a chart looked like a set of stairs, some sub-charts can include a single step, multiple steps, of a straight line depending on their respective size (e.g., amount of time shown in the respective sub-chart). It should, however, be noted that in some embodiments a sliding window algorithm can be non-overlapping (e.g., sub-charts created by a sliding window algorithm might not include portions of one or more other sub-charts).

By indexing sub-charts in a database, the portions can be searched faster than if someone were to simply compare a query (e.g., a sub-chart) to an entire chart (or multiple charts) that has not been indexed as sub-charts. Of course, in some cases a user may wish to compare a query comprising multiple sub-charts, which can take even more time if the charts to be searched are not stored in "smaller" portions within a database. Of course, as will be discussed below, the term smaller is relative since all charts (e.g., charts and their respective sub-charts) can be stored as a set of data that is the same size regardless of the respective "size" of the chart/sub-chart. For example, regardless of the amount of time two charts represent, they can be stored in vectors that are the same size and/or comprise the same number of features.

As described above, some charts may have different resolutions (e.g., a time span of 1 week, 2 weeks, etc.), ranges/scales (e.g., temperatures, pressure, values often shown on Y-axes), or dimensions (e.g., the number of channels) than other charts. The type or amplitude of values in one chart may be different from the type or amplitude of values in another chart, even though the features of the first chart and a section of the second chart appear the same visually. Conversely, two charts can appear the same visually, but can be very different if they utilize different units (e.g., different time intervals). As will be described in more detail below, in some embodiments charts may be normalized prior to being compared. Thus, while portions of this disclosure discuss chart searching, in various embodiments this disclosure discloses searching for similar patterns in multi-dimensional windows (e.g., periods of time) across different resolutions and scales.

Figure 1:
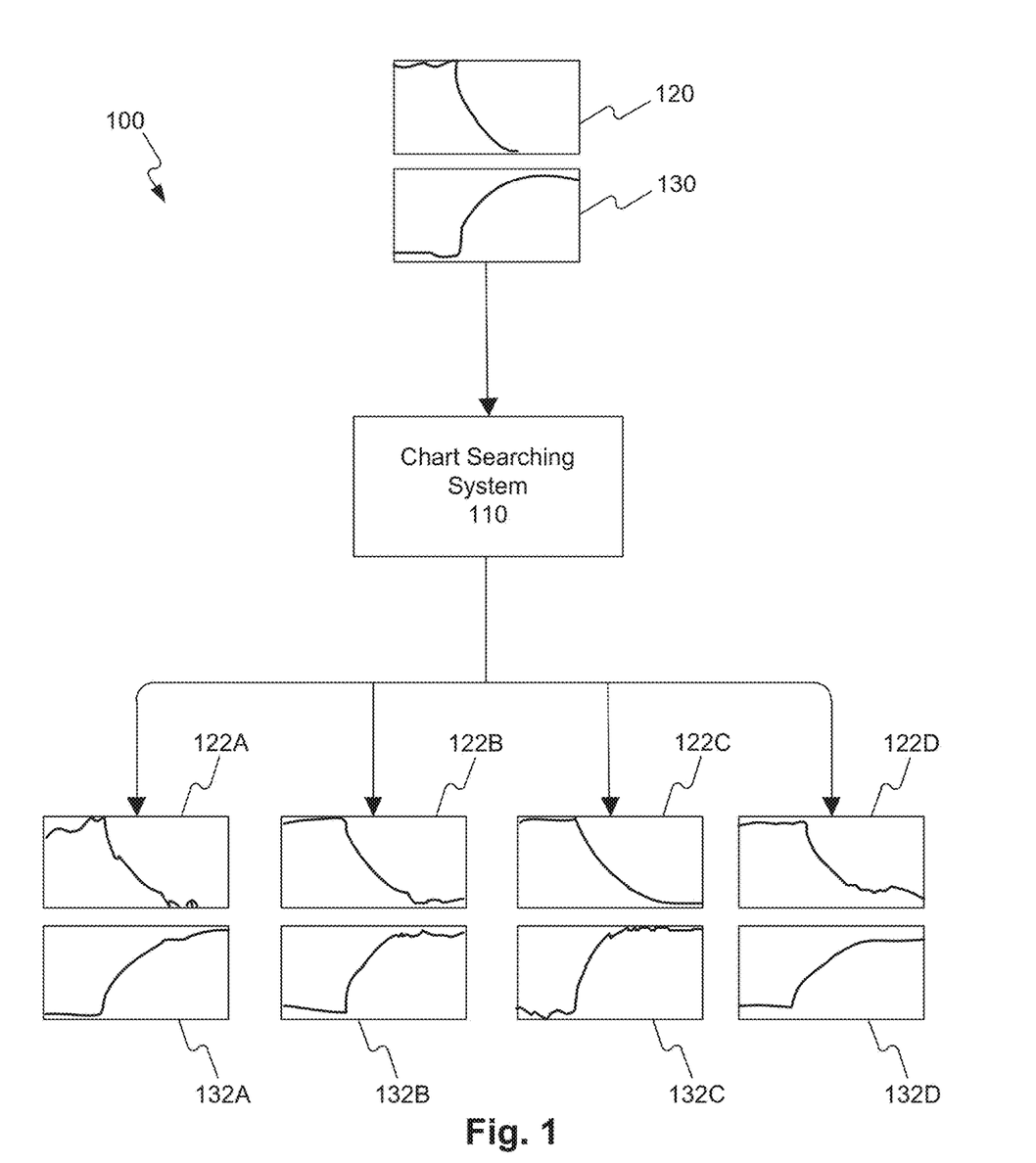
FIG. 1 is a block diagram of an exemplary system for chart searching, consistent with embodiments of the present disclosure.

FIG. 1 is a block diagram 100 of an exemplary system for comparing charts, consistent with embodiments of the present disclosure. Block diagram 100 includes a first chart 120 and a second chart 130 (which can also be referred to as a query comprising two charts, or a two-dimensional chart). Charts 120 and 130 are inputted into a chart searching system 110. The chart searching system 110 then outputs at least one chart. As shown in diagram 100, chart searching system provided 8 charts 122A-D (collectively known as 122) and 132A-D (collectively known as 132) as output (which can also be referred to as four two-dimensional charts). In some embodiments, chart searching system 110 may output more or fewer charts.

It should be noted that a query comprising a set of two charts 120 and 130 was used as input for chart searching system 110. In some embodiments, the chart searching system 110 may return the same number of charts that it received as input. Of course, chart searching system 110 may return additional, or fewer charts than those inputted into the chart searching system 110. In some embodiments where more than one chart is entered as a query, the similarities of a first chart within a query and the chart search results associated with that first chart can be weighted more heavily than the similarities of the second chart of a query and the chart search results that it caused to be returned. Herein, the term chart search can be used to describe a search that accepts a query in the form of one or more charts, and provides results in the form of one or more charts—in a manner similar to image searches where an image is the input and similar images are the output.

In some embodiments, for example block diagram 100, different charts 120 and 130 can display identical time periods on their X-axes. The identical period of time can be the actual period of time (e.g., the same resolution and the same start time/both chart 120 and 130 consist of values that occurred at 12:30 a.m. to 1:00 p.m. on the same day of the same year), or an identical amount of time (e.g., both charts have the same resolution but not necessarily the same start time/both chart 120 and 130 show 30 minutes of values). As a response, the output of chart searching system 110 can display charts with similar features that occurred at the same actual time (e.g., charts 122 and 132 both show values occurring between 12:30 a.m. to 1:00 p.m. on the same day of the same year as the inputted charts, or charts 122 and 132 both show values occurring during the same 30 minutes on the same day of the year as each other). Alternatively, outputted charts 122 and 132 may display sub-charts that most closely resemble the respective inputs (120 and 130, respectively) regardless of the times represented in charts 122 and 132.

Figure 2:
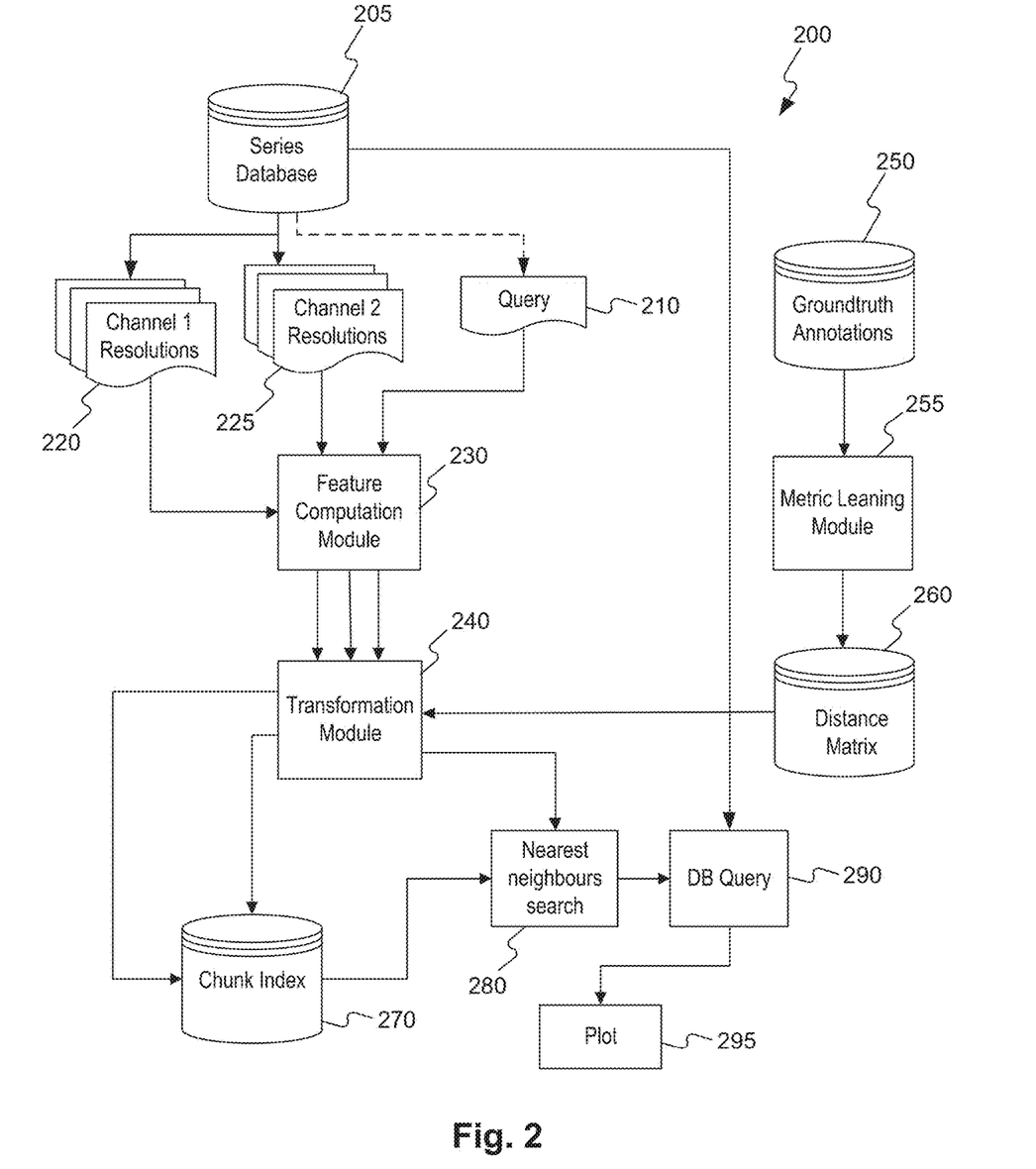
FIG. 2 is a block diagram of an exemplary system for chart searching, consistent with embodiments of the present disclosure.

FIG. 2 is a block diagram of an exemplary system 200 for chart searching, consistent with embodiments of the present disclosure. In some embodiments, chart searching system 110 can be implemented using a portion or all of system 200. System 200 can comprise a series database 205, a query 210, channel 1 resolutions 220, channel 2 resolutions 225, a feature computation module 230, and a transformation module 240. Further, system 200 can include groundtruth annotations 250, a metric learning module 255, and at least one distance matrix 260. System 200 can also comprise a chunk index 270, a nearest neighbours search module 280, a database query module 290, and a plot module 295.

Series database 205 can comprise charts, which as described above may include, but are not limited to: portions of charts (e.g., sub-charts, sub-windows, sub-sets of data, etc.), features associated with charts, sub-set features, channels associated with charts (e.g., expressions of electrical signals), etc. The series database 205 can comprise raw data (e.g., charts), which can be compared. For example, the series database 205 can contain a set of points (e.g., X and Y values), and data for a particular chart can be determined by retrieving all of the X values, then filtering and/or uniformly sampling the X values to create, for example, a chart with 1,000 equally spaced points. In some embodiments, a series database 205 may comprise multiple channels (e.g., channel 1 resolutions 220, channel 2 resolutions 225, multiple Y values for each X value, etc.) that can be depicted as sub-charts, which can then be compared to a query 210. The sub-charts (e.g., channel resolutions 220 and 225), as well as the query 210, can be transmitted to feature computation module 230 from series database 205.

A query 210 can be received by feature computation module 230 from a variety of sources. For instance, the query 210 can be received from a series database 205. In some embodiments, the query 210 can be received from another source such as a sensor, or another electronic device such as a computer, server, or a second series database (e.g., a series database that did not provide the channel resolutions 220 and 225). Of course, a query may include more than one chart, as described above.

Feature computation module 230 can perform a variety of functions. In some embodiments, feature computation module 230 can create sub-charts and compute features associated with those sub-charts (which may be derived from channel resolutions 220 and 225). For example, a chart (e.g., a sub-chart derived from a channel, or a sub-chart of a sub-chart derived from a channel (also known as a sub-sub-chart)) can comprise features, and values associated with those features, indicating features such as values at particular points (e.g., Y-axis values), average slopes (e.g., the slope between three or more points, the average slope in an entire chart), a min-max difference (e.g., the difference between the highest value represented by a line in a chart and the lowest value represented by the line in the chart). Regardless of the size (e.g., amount of time, scale, etc.) of a chart or sub-chart (which can include a sub-sub-chart), any chart or sub-chart can be represented by the same amount of values (e.g., in a vector or other data structure). In some embodiments, for each sub-chart indexed by a chart searching system, 5 values at particular points may be determined, an average slope of the sub-chart may be determined, and a min-max difference may be determined. These values can be compared with the same values determined in one or more charts included in a query. Thus, if 7 values are associated with each sub-chart, 10 overlapping sub-charts would include 70 values. Of course, additional or fewer features may be determined by a feature computation module 230. In some embodiments, whether additional or fewer features are to be determined for various sub-charts and queries may be modified by a user (e.g., by setting the values on a computer), or may be modified automatically based on resources associated with one or more processors or networks. Typically, the more features that are captured the better the results of a chart search will be. Further, features may be stored in a database, table, or other type of data-structure for faster searching.

After the features associated with sub-charts (e.g., channel resolutions 220 and 225) and query 210 are computed, they can be transmitted as a data structure such as a vector to transformation module 240. Transformation module 240 can perform functions including, but not limited to: normalizing charts (e.g., normalizing the range of a chart, where a signal going from 1 to 100 is normalized to go from 0 to 1; and/or normalizing one or more features, such that the overall mean for a feature is 0 and its variance is 1 (in other words, the features in a series database 205 are computed, and the mean/variance for each feature is computed, and then used to normalize values)), scaling charts, adjusting charts based on the values indicated by X-axes and Y-axes, etc. Transformation module 240 can normalize sub-charts based on query 210 such that the differences in the values and/or intervals between values are accounted for. In other words, the charts (or values representing those charts) can be normalized such that they look the same if they are displaying similar data, or such that they do not look the same if they are displaying dissimilar data.

Transformation module 240 can also receive input from at least one distance matrix 260. All, or a portion of, distance matrix 260 can be applied (e.g., multiplied) to one or more sub-charts and charts included in a query. A machine learning approach (e.g., a nearest neighbor search such as a Large Margin Nearest Neighbour (LMNN) search) can be used to learn a distance matrix 260.

Distance matrix 260 can be a square matrix of several values, and can give weight to different values in each sub-chart. If more than one chart (e.g., type of value such as temperature, pressure, etc.) is being searched for, a distance matrix 260 may correspond to each respective chart. For example, one, or more, distance matrices 260 can be associated with both temperature and pressure. In some embodiments, a chart searching system can determine whether two measurements occurred at substantially the same time. In such a case, the corresponding charts can be combined using the geometric mean of the inverses of distances (e.g., via a nearest neighbor search).

Groundtruth annotations 250 and metric learning module 255 assist a chart searching system with providing the most accurate results. The system 200 can be provided with a set of queries, provide results, and a user or another module can annotate results that are similar to the query. These annotations can be stored as groundtruth annotations 250, and used in a metric learning algorithm/module 255 to learn a distance matrix 260. This allows a chart searching system to provide more accurate results when performing subsequent queries.

The distance matrix 260 can be decomposed using Cholesky decomposition. Thus, if D is the distance matrix 260, D=L*LT, where LT represents the transpose of L. The matrix L can be used to transform features included in the query and channel resolutions at transformation module 240. Subsequently, in some embodiments, transformed sub-charts can be transmitted to a chunk index 270. Of course, in some embodiments the transformation module might not transform a sub-chart or query 210. In any case, the chunk index 270 can store vectors that contain values associated with the features of a sub-chart. For example, a vector may contain 5 values associated with a sub-chart, an average slope associated with a sub-chart, and a min-max value associated with a sub-chart. Further, these seven values could have been transformed by transformation module 240. Once indexed in a chunk index 270, the sub-charts (which can be represented as vectors), can be compared to a query using a nearest neighbours search, and if the sub-charts meet a particular threshold (e.g., similarity threshold on distance (all results closer than a particular distance), and/or a threshold on the number of results (only a few results are shown which are typically the most similar results), etc.), they can be associated with one or more sub-charts. In some embodiments, a threshold amount of closeness can be configured by a user, or can be based on system resources such as bandwidth and/or processing characteristics.

The nearest neighbours search module 280 can receive inputs from the transformation module 240. Inputs may include one or more sub-charts stored in the chunk index 270, and one or more queries 210. The nearest neighbours search module can perform a search to determine whether the query comprises features similar to any portions of the sub-charts. After a nearest neighbours search is performed, database module 290 can compare one or more queries 210 with the channel resolutions 220 and 225 from the series database 205 by retrieving raw data from series database 205 for visualization. A result can be a set of results, where each result comprises a start time, an end time, and various channels. Subsequent to the database query, the results may be plotted by plot module 295. The plot module can be used to display results of a chart searching system in a variety of methods, including exporting them as spreadsheets or .CSV files. In some embodiments, a plot module (or another device) can transmit results over a network.

Figure 3:
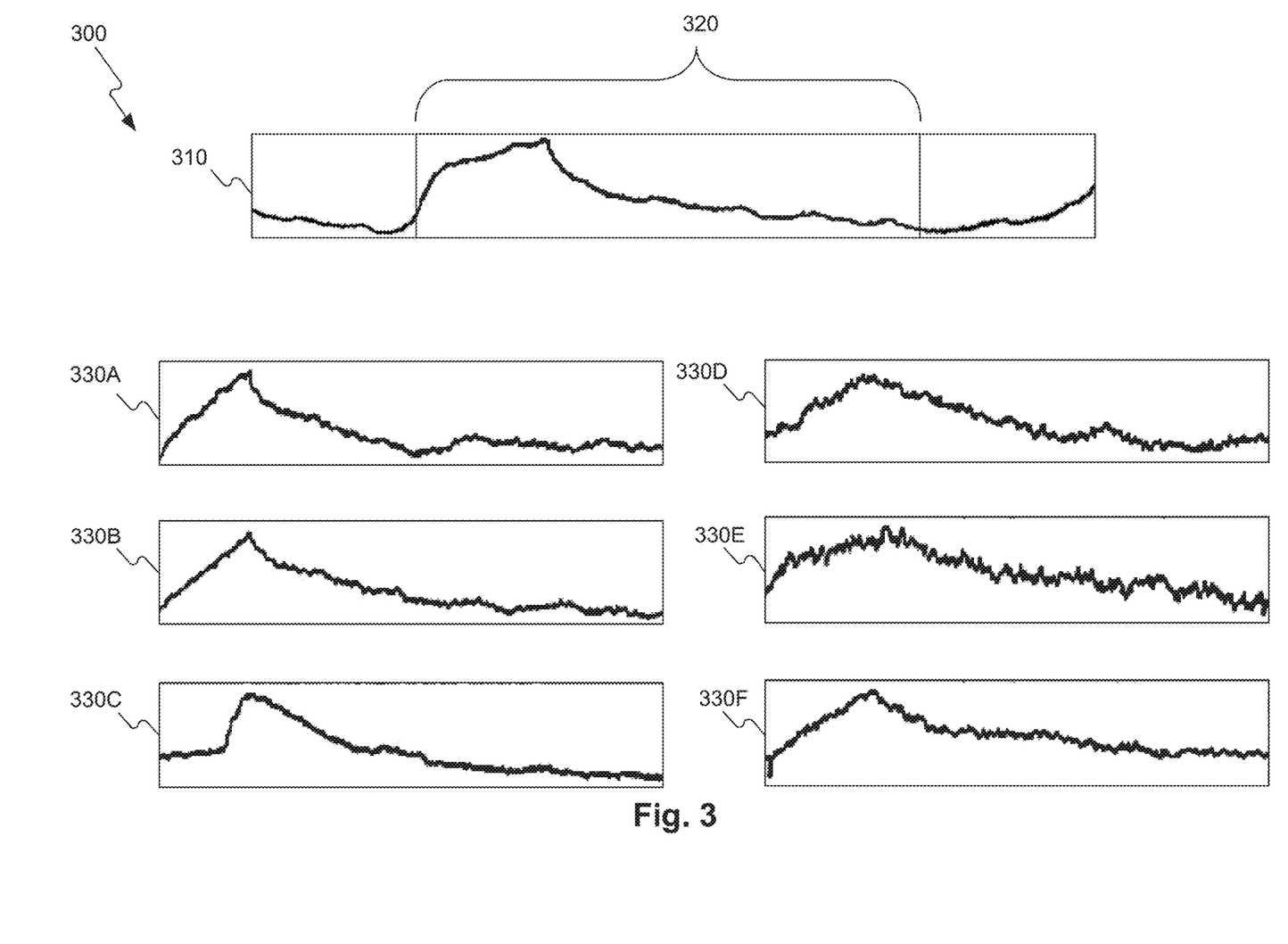
FIG. 3 is a diagram of exemplary charts, consistent with embodiments of the present disclosure.

FIG. 3 is a diagram that shows exemplary charts 300, consistent with embodiments of the present disclosure. Exemplary charts 300 include a chart 310, which can be a portion of a signal as described above. Chart 310 includes sub-chart 320. In some embodiments, sub-chart 320 can be used as a query. In FIG. 3, results 330A-F (collectively 330) can be the results if sub-chart 320 was a query, for example. In various embodiments, results 330 may be organized based on their similarity to a query sub-chart 320. Of course, in various embodiments a chart search system can be configured to provide more than one chart as a result 330, as shown in FIG. 1.

Figure 4:
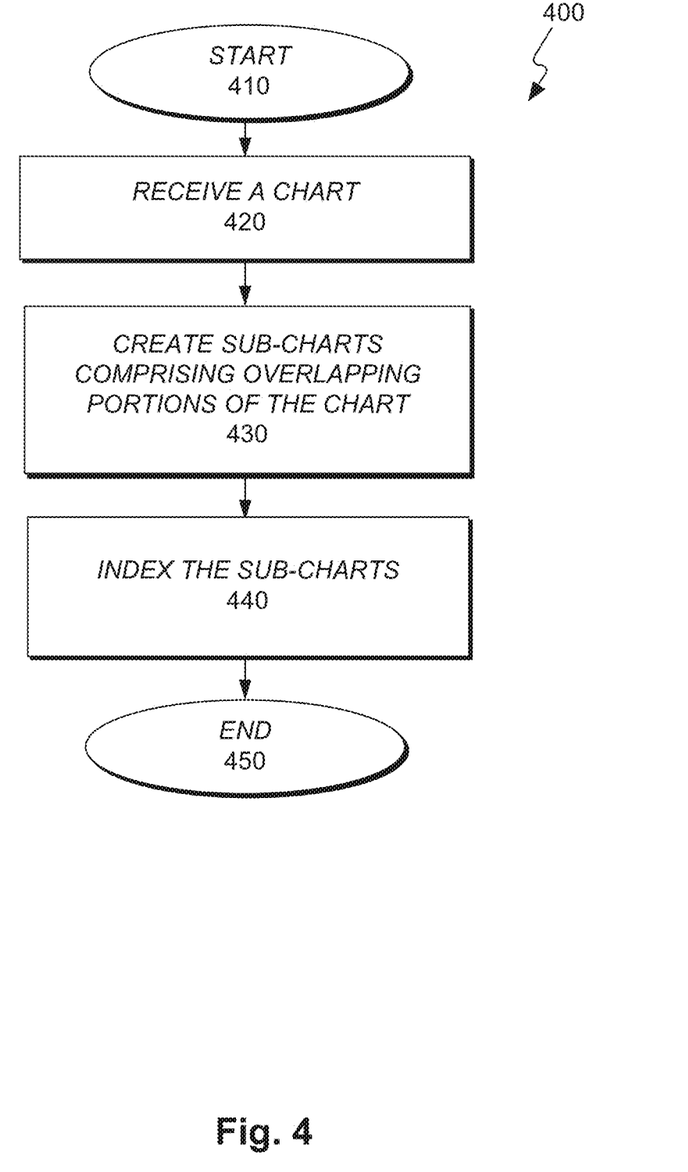
FIG. 4 is a flowchart representing an exemplary an exemplary method for indexing charts, consistent with embodiments of the present disclosure.

FIG. 4 is a flowchart 400 representing an exemplary method for indexing charts. While the flowchart discloses the following steps in a particular order, at least some of the steps can be performed in a different order, performed in parallel, modified, or deleted where appropriate, consistent with the teachings of the present disclosure. Further, steps may be added to flowchart 400. The indexing can be performed in full or in part by a chart searching system (e.g., chart searching system 110, system 200, etc.). In addition or alternatively, some or all of these steps can be performed in full or in part by other devices and/or modules.

FIG. 4 starts at 410 and receives a chart, as shown in step 420. As discussed above, more than one chart may be received. In any case, after a chart is received, sub-charts are created at step 430 using a sliding window algorithm. The term sub-charts may be used interchangeably with portions of a chart, etc., since a sub-chart is simply a portion of another chart. The sub-charts can overlap with each other. That is to say, that the sub-charts may include portions of other sub-charts since they are created based on a sliding window algorithm. If one were to look at a chart, a first sub-chart may start at time 00:00 and end at time 00:10, while a second sub-chart may start at time 00:01 and end at time 00:11. In some embodiments, a sub-chart may overlap with 99% of another sub-chart. Similarly, in some embodiments, a sub-chart may overlap with 90%, 85%, 50%, or any percentage of another sub-chart. The percentage can be determined by an administrator or a device and be based on various factors such as amounts of storage space, processing power, or other resources.

At step 440, the sub-charts are indexed. Indexing, as used herein, involves storing sub-charts (e.g., portions of a chart), with one or more identifiers (also known as keys) such as the chart's start time and/or length. For example, each sub-chart can be characterized by a channel, a start time, and a length. An index, in such an example, can be a table as characterized below:

row 1: (time start, length1)→(ch_id1, features1), (ch_id2, features2) . . .
row 2: (time start2, length1)→(ch_id1, features1), (ch_id2, features2) . . .

In some embodiments, a table (or database, etc.) can be appended and scaled in real or near-real-time by adding additional rows. It is contemplated that other identifiers can be associated with a sub-chart such as an identifier associated with the larger chart (e.g., channel, signal, etc.) from which the sub-chart is derived. The flowchart 400 then ends at step 450.

Figure 5:
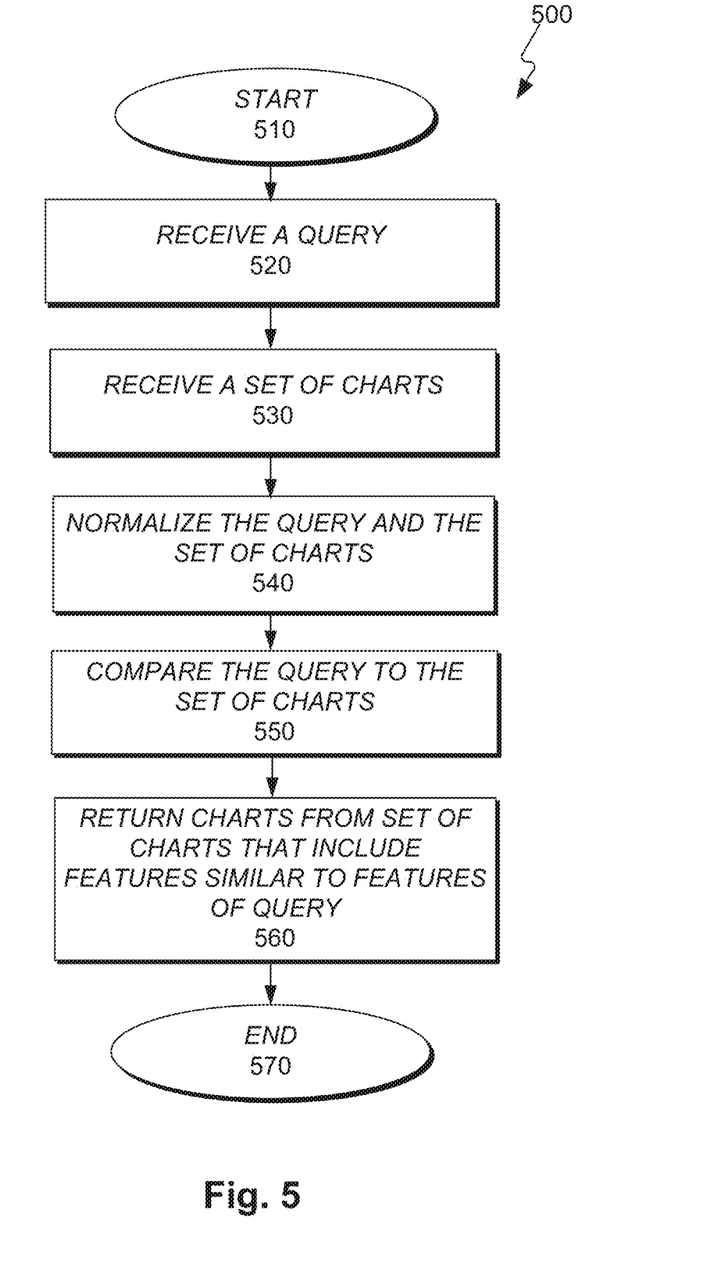
FIG. 5 is a flowchart representing an exemplary method for chart searching, consistent with embodiments of the present disclosure.

FIG. 5 is a flowchart 500 representing an exemplary method for chart searching. As with flowchart 400, some or all of the steps included in flowchart 500 can be modified, removed, performed in a different order, or performed in parallel. Also, steps can be added to flowchart 500. Chart searching may be done in whole or in part by an electronic device such as chart searching system 110, system 200, etc. In some embodiments, the chart searching can be performed partially or wholly by additional devices, modules, etc., that are not shown in the figures.

Flowchart 500 starts 510 by receiving a query 520. A query can be a whole chart, a portion of a larger chart, or can include multiple charts. In any case, a query can comprise features that can be compared to and/or associated with charts that have been stored and/or indexed. The query can be received from the same location as the charts that it will be compared to. In some embodiments, a query can be received from another location. For example, it may be provided by a user, retrieved from a network storage device or website, received from a sensor or other electronic device, etc. In some embodiments where a query includes multiple charts, the multiple charts similarly can be received from the same or different places. For example, one of the received charts can be stored in a database with the charts that it is going to be compared with, while another chart can be received from another location. In some embodiments, charts received from different places/locations/devices can include the same time span.

At step 530, a set of charts is received. The set of charts includes the charts that will be compared to the query (or at least the features of each chart will be compared). At step 540, at least the query is normalized. Any type of normalization can be used to normalize the query and/or other charts, as described above. In some embodiments, the amplitude of some or all of the query and/or charts (which as described above can include signals) can be normalized such that their amplitude has a mean value of 0 and energy of 1. Energy of a query and/or chart can be the square norm of its features, which can be stored in a vector.

At step 550, the query is compared to the set of charts. In various embodiments, the way in which a query is compared to a set of charts may vary based on the configuration of a system. In some embodiments, features based on a chart and/or query can stored in a vector, normalized, and/or compared with one another. The query may be compared with all, or some of the charts stored in a system. For example, a comparison can be made between a query and each sub-chart/sub-window as determined using a sliding-window algorithm. The comparison, as described in an example above, may comprise comparing features stored in vectors, In the example above, the vectors could comprise 70 dimensions (e.g., (5 features, an average slope, a min-max value)×10 sub-charts/sub-windows). When comparing these vectors with a nearest neighbour search, in some embodiments, a Euclidean distance can be used. Alternatively, a metric learning algorithm (e.g., an LMNN search) can be used to learn a distance matrix. Annotations (generated manually or otherwise) can also be associated with metrics and a distance matrix to generate more accurate results. In some embodiments, a comparison can be represented as:

(feat1−feat2)T*M*(feat1−feat2)

where M is a distance matrix and (feat1−feat2)T is (feat1−feat2) transposed. Such a comparison could increase calculating the distance from O(D) arithmetic operations to O(D2) arithmetic operations. In some embodiments, features/vectors can be transformed at the time that a sub-chart is indexed previous to receipt of a query. When a query is received, the sub-charts can be transformed and only the query (e.g., chart(s), vector(s) corresponding with the query) needs to be transformed. Thus, in some embodiments where the indexed charts/sub-charts are already transformed, a comparison can be performed using a Euclidean distance, a transformed query, and the set of indexed charts/sub-charts that were previously transformed, thereby reducing the calculations necessary to perform a comparison.

At step 560, charts from the set of charts that include features similar to the features of the query are returned. For example, the top 10 charts that are closest to a query may be provided and/or displayed for a user. The term closest, as used herein, can refer to the results of a nearest neighbour search (also known as a proximity search or similarity search), with the top results being the charts that are the most similar. The method then ends at step 570.

Figure 6:
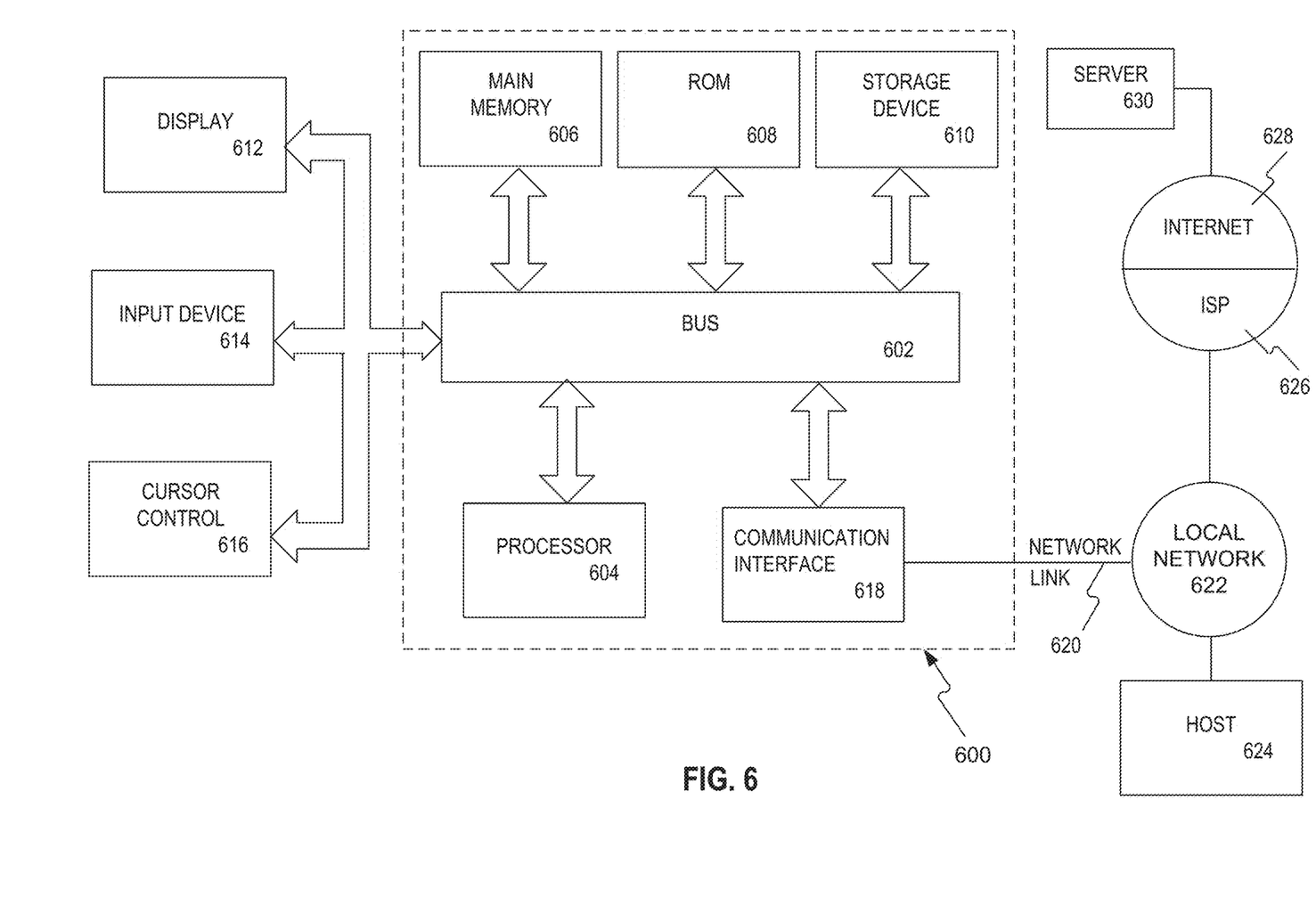
FIG. 6 is a block diagram of an exemplary computer system, consistent with embodiments of the present disclosure.

FIG. 6 is a block diagram of an exemplary computer system 600, consistent with embodiments of the present disclosure. Components of chart search system 110, or system 200, can include the architecture based on or similar to that of computer system 600.

As illustrated in FIG. 6, computer system 600 can include a bus 602 or other communication mechanism for communicating information, and one or more hardware processors 604 (denoted as processor 604 for purposes of simplicity) coupled with bus 602 for processing information. Hardware processor 604 can be, for example, one or more microprocessors or it can be a reduced instruction set of one or more microprocessors.

Computer system 600 also includes a main memory 606, such as a random access memory (RAM) or other dynamic storage device, coupled to bus 602 for storing information and instructions to be executed by processor 604. Main memory 606 also can be used for storing temporary variables or other intermediate information during execution of instructions to be executed by processor 604. Such instructions, after being stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc. is provided and coupled to bus 602 for storing information and instructions.

Computer system 600 can be coupled via bus 602 to a display 612, such as a cathode ray tube (CRT), liquid crystal display, or touch screen, for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. The input device typically has two degrees of freedom in two axes, a first axis (for example, x) and a second axis (for example, y), that allows the device to specify positions in a plane. In some embodiments, the same direction information and command selections as cursor control can be implemented via receiving touches on a touch screen without a cursor.

Computing system 600 can include a user interface module to implement a graphical user interface that can be stored in a mass storage device as executable software codes that are executed by the one or more computing devices. This and other modules can include, by way of example, components, such as software components, object-oriented software components, class components and task components, processes, functions, fields, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, Lua, C or C++. A software module can be compiled and linked into an executable program, installed in a dynamic link library, or written in an interpreted programming language such as, for example, BASIC, Perl, or Python. It will be appreciated that software modules can be callable from other modules or from themselves, and/or can be invoked in response to detected events or interrupts. Software modules configured for execution on computing devices can be provided on a computer readable medium, such as a compact disc, digital video disc, flash drive, magnetic disc, or any other tangible medium, or as a digital download (and can be originally stored in a compressed or installable format that requires installation, decompression, or decryption prior to execution). Such software code can be stored, partially or fully, on a memory device of the executing computing device, for execution by the computing device. Software instructions can be embedded in firmware, such as an EPROM. It will be further appreciated that hardware modules can be comprised of connected logic units, such as gates and flip-flops, and/or can be comprised of programmable units, such as programmable gate arrays or processors. The modules or computing device functionality described herein are preferably implemented as software modules, but can be represented in hardware or firmware. Generally, the modules described herein refer to logical modules that can be combined with other modules or divided into sub-modules despite their physical organization or storage.

Computer system 600 can implement the techniques described herein using customized hard-wired logic, one or more ASICs or FPGAs, firmware and/or program logic which in combination with the computer system causes or programs computer system 600 to be a special-purpose machine. According to some embodiments, the operations, functionalities, and techniques and other features described herein are performed by computer system 600 in response to processor 604 executing one or more sequences of one or more instructions contained in main memory 606. Such instructions can be read into main memory 606 from another storage medium, such as storage device 610. Execution of the sequences of instructions contained in main memory 606 causes processor 604 to perform the process steps described herein. In alternative embodiments, hard-wired circuitry can be used in place of or in combination with software instructions.

The term "non-transitory media" as used herein refers to any non-transitory media storing data and/or instructions that cause a machine to operate in a specific fashion. Such non-transitory media can comprise non-volatile media and/or volatile media. Non-volatile media can include, for example, optical or magnetic disks, such as storage device 610. Volatile media can include dynamic memory, such as main memory 606. Common forms of non-transitory media can include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, any other memory chip or cartridge, a cache, a register, and networked versions of the same.

Non-transitory media is distinct from, but can be used in conjunction with, transmission media. Transmission media can participate in transferring information between storage media. For example, transmission media can include coaxial cables, copper wire and fiber optics, including the wires that comprise bus 602. Transmission media can also take the form of acoustic or light waves, such as those generated during radio-wave and infra-red data communications.

Various forms of media can be involved in carrying one or more sequences of one or more instructions to processor 604 for execution. For example, the instructions can initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 can optionally be stored on storage device 610 either before or after execution by processor 604.

Computer system 600 can also include a communication interface 618 coupled to bus 602. Communication interface 618 can provide a two-way data communication coupling to a network link 620 that can be connected to a local network 622. For example, communication interface 618 can be an integrated services digital network (ISDN) card, cable modem, satellite modem, or a modem to provide a data communication connection to a corresponding type of telephone line. As another example, communication interface 618 can be a local area network (LAN) card to provide a data communication connection to a compatible LAN. Wireless links can also be implemented. In any such implementation, communication interface 618 can send and receives electrical, electromagnetic or optical signals that carry digital data streams representing various types of information.

Network link 620 can typically provide data communication through one or more networks to other data devices. For example, network link 620 can provide a connection through local network 622 to a host computer 624 or to data equipment operated by an Internet Service Provider (ISP) 626. ISP 626 in turn can provide data communication services through the world wide packet data communication network now commonly referred to as the "Internet" 628. Local network 622 and Internet 628 can both use electrical, electromagnetic or optical signals that carry digital data streams. The signals through the various networks and the signals on network link 620 and through communication interface 618, which carry the digital data to and from computer system 600, can be example forms of transmission media.

Computer system 600 can send messages and receive data, including program code, through the network(s), network link 620 and communication interface 618. In the Internet example, a server 630 can transmit a requested code for an application program through Internet 628, ISP 626, local network 622 and communication interface 618. The received code can be executed by processor 604 as it is received, and/or stored in storage device 610, or other non-volatile storage for later execution. In some embodiments, server 630 can provide information for being displayed on a display.

Embodiments of the present disclosure have been described herein with reference to numerous specific details that can vary from implementation to implementation. Certain adaptations and modifications of the described embodiments can be made. Other embodiments can be apparent to those skilled in the art from consideration of the specification and practice of the embodiments disclosed herein. It is intended that the specification and examples be considered as exemplary only, with a true scope and spirit of the present disclosure being indicated by the following claims. It is also intended that the sequence of steps shown in figures are only for illustrative purposes and are not intended to be limited to any particular sequence of steps. As such, it is appreciated that these steps can be performed in a different order while implementing the exemplary methods or processes disclosed herein.

What is claimed is:
1. A system comprising:
a memory device that stores a set of instructions;

one or more processors configured to execute the set of instructions to cause the system to:
display a first chart comprising at least a first axis;
receive a query comprising at least a user-selected portion of the first chart along at least the first axis of the first chart;
analyze at least the user-selected portion of the first chart to determine a first set of features associated with the user-selected portion of the first chart;
generate an index of a plurality of sub-charts, wherein generating the index comprises at least:
determining a plurality of sub-charts based on at least a portion of a second chart;
analyzing the respective sub-charts to determine respective second sets of features; and
generating the index of at least the plurality of sub-charts and respective second sets of features;
compare, using at least the index, the first set of features to one or more of the second sets of features associated with the respective sub-charts to determine an amount of similarity between each combination of the first set of features and the one or more of the second sets of features; and
in response to determining that the first set of features has a threshold amount of similarity to one of the second sets of features:
determine one of the sub-charts that is associated with the one of the second sets of features; and
output for display, as a response to the query, at least a representation of the one of the sub-charts.

2. The system of claim 1, wherein the set of instructions further causes the system to:
determine a distance matrix associated with to the first chart, and
wherein comparing the first set of features to one or more of the second sets of features comprises at least comparing the first set of features to the one or more of the second set of features using the distance matrix and a nearest neighbor search or a Euclidean distance.

3. The system of claim 2, wherein the distance matrix is used to determine a distance from the first set of features to the second set of features.

4. The system of claim 2, wherein:
the distance matrix is determined using a machine learning approach, the second sets of features are transformed, for use with the distance matrix, before receipt of the query, and
the distance matrix is one of a plurality of different distance matrices corresponding to different charts.

5. The system of claim 1, wherein each sub-chart of the plurality of sub-charts comprises a portion of the second chart included in another sub-chart of the plurality of sub-charts.

6. The system of claim 5, wherein the respective second sets of features associated with the respective sub-charts comprise at least one of: one or more values that correspond to an average value of a signal associated with the respective sub-charts, one or more slopes associated with the respective sub-charts, one or more min-max differences associated with the respective sub-charts, or ranges of data included in the respective sub-charts.

7. The system of claim 1, wherein at least some of the sub-charts overlap with adjacent sub-charts of the second chart.

8. The system of claim 7, wherein each sub-chart represents a portion of a signal.

9. The system of claim 1, wherein the set of instructions further causes the system to:
further in response to determining that the first set of features has the threshold amount of similarity to one of the second sets of features:
display the query as a line chart; and
display the one of the sub-charts as a line chart.

10. The system of claim 1, wherein the set of instructions further causes the system to:
normalize at least the user-selected portion of the first chart and at least the portion of the second chart,
wherein analyzing at least the user-selected portion of the first chart comprises analyzing the normalized user-selected portion of the first chart, and
wherein determining the plurality of sub-charts comprises determining the plurality of sub-charts based on the normalized portion of the second chart.

11. The system of claim 10, wherein:
the plurality of sub-charts are determined from at least the portion of the second chart using a sliding window,
each of the plurality of sub-charts corresponds to a different portion of the normalized portion of the second chart within the sliding window as the sliding window is moved within the normalized portion of the second chart,
each sub-chart overlaps with an adjacent sub-chart of the second chart, and
a size of the sliding window is determined based on at least one of: a storage space of the system, a processing power of the system, network resources of the system, or a type of data represented by the second chart.

12. A method comprising:
displaying a first chart comprising at least a first axis;
receiving a query comprising at least a user-selected portion of the first chart along at least the first axis of the first chart;
analyzing at least the user-selected portion of the first chart to determine a first set of features associated with the user-selected portion of the first chart;
generating an index of a plurality of sub-charts, wherein generating the index comprises at least:
determining a plurality of sub-charts based on at least a portion of a second chart;
analyzing the respective sub-charts to determine respective second sets of features; and
generating the index of at least the plurality of sub-charts and respective second sets of features;
comparing, using at least the index, the first set of features to one or more of the second sets of features associated with the respective sub-charts to determine an amount of similarity between each combination of the first set of features and the one or more of the second sets of features; and
in response to determining that the first set of features has a threshold amount of similarity to one of the second sets of features:
determining one of the sub-charts that is associated with the one of the second sets of features; and
outputting for display, as a response to the query, at least a representation of the one of the sub-charts.

13. The method of claim 12 further comprising:
determining a distance matrix associated with to the first chart, and
wherein comparing the first set of features to one or more of the second sets of features comprises at least comparing the first set of features to the one or more of the second set of features using the distance matrix and a nearest neighbor search or a Euclidean distance.

14. The method of claim 12, wherein each sub-chart of the plurality of sub-charts comprises a portion of the second chart included in another sub-chart of the plurality of sub-charts.

15. The method of claim 14, wherein the respective second sets of features associated with the respective sub-charts comprise at least one of: one or more values that correspond to an average value of a signal associated with the respective sub-charts, one or more slopes associated with the respective sub-charts, one or more min-max differences associated with the respective sub-charts, or ranges of data included in the respective sub-charts.

16. The method of claim 12, wherein at least some of the sub-charts overlap with adjacent sub-charts of the second chart.

17. The method of claim 12 further comprising:
further in response to determining that the first set of features has the threshold amount of similarity to one of the second sets of features:
displaying the query as a line chart; and
displaying the one of the sub-charts as a line chart.

18. The method of claim 12 further comprising:
normalizing at least the user-selected portion of the first chart and at least the portion of the second chart,
wherein analyzing at least the user-selected portion of the first chart comprises analyzing the normalized user-selected portion of the first chart, and
wherein determining the plurality of sub-charts comprises determining the plurality of sub-charts based on the normalized portion of the second chart.

19. The method of claim 18, wherein:
the plurality of sub-charts are determined from at least the portion of the second chart using a sliding window,
each of the plurality of sub-charts corresponds to a different portion of the normalized portion of the second chart within the sliding window as the sliding window is moved within the normalized portion of the second chart,
each sub-chart overlaps with an adjacent sub-chart of the second chart, and
a size of the sliding window is determined based on at least one of: a storage space of a system, a processing power of a system, network resources of a system, or a type of data represented by the second chart.

20. A non-transitory computer-readable medium storing a set of instructions that are executable by one or more processors to cause the one or more processors to perform a method, the method comprising:
displaying a first chart comprising at least a first axis;
receiving a query comprising at least a user-selected portion of the first chart along at least the first axis of the first chart;
analyzing at least the user-selected portion of the first chart to determine a first set of features associated with the user-selected portion of the first chart;
generating an index of a plurality of sub-charts, wherein generating the index comprises at least:
determining a plurality of sub-charts based on at least a portion of a second chart;
analyzing the respective sub-charts to determine respective second sets of features; and
generating the index of at least the plurality of sub-charts and respective second sets of features;
comparing, using at least the index, the first set of features to one or more of the second sets of features associated with the respective sub-charts to determine an amount of similarity between each combination of the first set of features and the one or more of the second sets of features; and
in response to determining that the first set of features has a threshold amount of similarity to one of the second sets of features:
determining one of the sub-charts that is associated with the one of the second sets of features; and
outputting for display, as a response to the query, at least a representation of the one of the sub-charts.

* * * * *